(12) United States Patent
Schormann (10) Patent No.: US 9,400,597 B2
(45) Date of Patent: Jul. 26, 2016

(54) PRESENTING DYNAMIC GRIDS

(75) Inventor: Christian Schormann, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 451 days.

(21) Appl. No.: 12/177,886

(22) Filed: Jul. 23, 2008

(65) Prior Publication Data

US 2010/0020101 A1 Jan. 28, 2010

(51) Int. Cl.
| | |
|---|---|
| *G06F 17/24* | (2006.01) |
| *G09G 5/00* | (2006.01) |
| *G06F 3/0484* | (2013.01) |
| *G06T 11/20* | (2006.01) |
| *G06T 11/60* | (2006.01) |

(52) U.S. Cl.
CPC .......... *G06F 3/04845* (2013.01); *G06T 11/206* (2013.01); *G06T 11/60* (2013.01)

(58) Field of Classification Search
CPC ............................ G06T 11/60; G06F 3/04845
USPC .......... 345/619, 421, 677, 649, 650; 715/517, 715/764, 856
See application file for complete search history.

(56) References Cited

U.S. PATENT DOCUMENTS

| | | | | |
|---|---|---|---|---|
| 5,267,054 | A * | 11/1993 | Chang et al. ................... | 358/3.2 |
| 5,490,241 | A * | 2/1996 | Mallgren ............ | G06F 3/04842 345/419 |
| 5,717,869 | A | 2/1998 | Moran et al. | |
| 5,818,415 | A * | 10/1998 | Shirakawa .......... | G06F 3/04845 345/440 |
| 5,883,625 | A | 3/1999 | Crawford et al. | |
| 6,014,127 | A * | 1/2000 | Blomqvist ..................... | 715/856 |
| 6,279,014 | B1 | 8/2001 | Schilit et al. | |
| 6,297,798 | B1 | 10/2001 | Evans et al. | |
| 6,377,285 | B1 * | 4/2002 | Doan et al. ..................... | 715/764 |
| 6,771,276 | B1 * | 8/2004 | Highsmith et al. ........... | 345/619 |
| 6,847,363 | B1 | 1/2005 | Sauvageau | |
| 7,093,192 | B2 | 8/2006 | Mullen et al. | |
| 7,119,814 | B2 | 10/2006 | Meron et al. | |
| 7,181,438 | B1 | 2/2007 | Szabo | |

(Continued)

FOREIGN PATENT DOCUMENTS

| | | |
|---|---|---|
| JP | H06337909 A | 12/1994 |
| JP | H09259294 A | 10/1997 |

(Continued)

OTHER PUBLICATIONS

International Search Report cited in related application No. PCT/US2009/050889 dated Mar. 19, 2010.

(Continued)

*Primary Examiner* — Jin-Cheng Wang
(74) *Attorney, Agent, or Firm* — Kevin Sullivan; Micky Minhas (57) ABSTRACT

Grids are commonly used to provide an environment for users to orient objects within a drawing program. The properties of a grid are usually defined and set at the time the grid is created and do not change. An effective way to provide a useful grid that can adapt to objects a user has drawn is provided herein by presenting a dynamic grid on a display. The dynamic grid may adjust grid properties, such as the position of the origin, the angle of the grid, the size of gridline spacing, the coordinate mode, etc. The new grid properties are adjusted to accommodate what the user may draw next, based upon what the user previously drew.

20 Claims, 9 Drawing Sheets

(56) References Cited

U.S. PATENT DOCUMENTS

| | | | |
|---|---|---|---|
| 7,224,847 B2 | 5/2007 | Zhang et al. | |
| 7,233,341 B1 | 6/2007 | Sauerbrei | |
| 7,246,311 B2 | 7/2007 | Bargeron et al. | |
| 7,647,563 B2 | 1/2010 | Guido et al. | |
| 7,668,889 B2 | 2/2010 | Edwards et al. | |
| 7,809,731 B2 | 10/2010 | Collins | |
| 7,952,578 B2* | 5/2011 | Sawada | G06F 17/5018 345/419 |
| 2001/0015728 A1* | 8/2001 | Fujiwara | G06T 17/20 345/588 |
| 2003/0018502 A1 | 1/2003 | Rodriguez | |
| 2003/0227455 A1* | 12/2003 | Lake et al. | 345/421 |
| 2004/0239693 A1* | 12/2004 | Mullen et al. | 345/677 |
| 2004/0263537 A1 | 12/2004 | Faraday et al. | |
| 2005/0068290 A1* | 3/2005 | Jaeger | 345/156 |
| 2005/0160113 A1 | 7/2005 | Sipusic et al. | |
| 2005/0177303 A1 | 8/2005 | Han | |
| 2005/0183009 A1* | 8/2005 | Hannebauer et al. | 715/517 |
| 2005/0237321 A1* | 10/2005 | Young et al. | 345/418 |
| 2006/0041181 A1* | 2/2006 | Viswanathan et al. | 600/11 |
| 2006/0072828 A1 | 4/2006 | Silverbrook et al. | |
| 2006/0103857 A1* | 5/2006 | Janisch | 358/1.1 |
| 2006/0109144 A1* | 5/2006 | Xu | G01C 21/20 340/995.15 |
| 2006/0117273 A1 | 6/2006 | Smith et al. | |
| 2006/0156246 A1 | 7/2006 | Williams et al. | |
| 2006/0161838 A1 | 7/2006 | Nydam et al. | |
| 2006/0259872 A1* | 11/2006 | Mullen et al. | 715/764 |
| 2007/0146646 A1 | 6/2007 | Rodriguez, Jr. | |
| 2007/0174761 A1 | 7/2007 | Lin et al. | |
| 2007/0192416 A1 | 8/2007 | Gupta | |
| 2007/0198561 A1 | 8/2007 | Lee et al. | |
| 2007/0239828 A1 | 10/2007 | Patton et al. | |
| 2007/0266304 A1 | 11/2007 | Fletcher et al. | |
| 2008/0025592 A1 | 1/2008 | Jerebko et al. | |
| 2008/0098295 A1 | 4/2008 | Nelson et al. | |
| 2008/0201196 A1 | 8/2008 | Rowland | |
| 2008/0218532 A1* | 9/2008 | Young | 345/660 |
| 2008/0238922 A1* | 10/2008 | Rhodes et al. | 345/440 |
| 2009/0033678 A1* | 2/2009 | Case | 345/611 |
| 2009/0147620 A1* | 6/2009 | Pan | G01V 1/3808 367/21 |
| 2009/0162024 A1 | 6/2009 | Bradicich et al. | |
| 2009/0210779 A1 | 8/2009 | Badoiu et al. | |
| 2009/0327856 A1 | 12/2009 | Mouilleseaux et al. | |

FOREIGN PATENT DOCUMENTS

| | | |
|---|---|---|
| JP | 2000073589 A | 3/2000 |
| KR | 10-2006-0043083 A | 5/2006 |

OTHER PUBLICATIONS

U.S. Appl. No. 12/179,574, filed Jul. 24, 2008, Schormann.
Huang, et al., "Ad-Hoc Collaborative Document Annotation on a Tablet PC", Dated: May 2, 2003, pp. 1-8.
Ide, et al., "GrAF: A Graph-Based Format for Linguistic Annotations", Proceedings of the Linguistic Annotation Workshop, Dated: Jun. 2007, pp. 1-8.
Mikovec, et al., "Visualization of Users' Activities in a Specific Environment", Proceedings of the 2007 Winter Simulation Conference, S. G. Henderson, B. Biller, M.-H. Hsieh, J. Shortie, J. D. Tew, and R. R. Barton, eds., Publication Date: Dec. 9-12, 2007, pp. 738-746.
Muller, et al., "Multi-Level Annotation in MMAX", In Proceedings of the 4th SIGdial Workshop on Discourse and Dialogue, Sapporo, Japan, Jul. 4-5, 2003, pp. 198-207.

Chinese Notice of Allowance cited in Chinese Application No. 200980129989.3 dated Feb. 7, 2013, 6 pgs.
Final Office Action cited in U.S. Appl. No. 12/179,574 dated Mar. 5, 2013, 29 pgs.
Reply Final Office Action cited in U.S. Appl. No. 12/179,574 dated Jun. 5, 2013, 19 pgs.
Non-Final Office Action cited in U.S. Appl. No. 12/179,574 dated Jul. 3, 2013, 36 pgs.
"R Graph Gallery-Scatterplots with smoothed densities color representation", addictedfor.free.fr., Apr. 11, 2006, reprinted from the Internet at: http://web.archive.org/web/20060419081535/http://addictedfor.free.fr/graphiques/RGraphGallery.php?graph=139, pp. 1-3.
"Mutli-Search of Video Segments Indexed by Time-Aligned Annotations of Video Content", Anni Coden, Norman Haas and Robert Mack, Annotation of Video Content, Jan. 1, 1998, reprinted from the Internet at: http://www.google.com/search?sourceid=navclient&aq=&oq=Multi-Search+of+Video+Segments+Indexed+by+Time-Aligned+Annotations+of+Video+Content&ie=UTF-8&rlz=1T4ADRA_enUS455US456&q=Multi-Search+of+Video+Segments+Indexed+by+Time-Aligned+Annotations+of+Video+Content&gs_I=hp...0.0.0.14781...........0.sQh2tnh4IMY, 12 pgs.
Russian Notice of Allowance cited in Russian Application No. 2011102438 dated Jan. 27, 2014, 6 pgs.
"Office Action Received for Korean Patent Application No. 10-2011-7001081", Mailed Date: Mar. 5, 2015, 4 Pages.
Kamel, et al., "Sketching Images Eyes-Free: A Grid-Based Dynamic Drawing Tool for the Blind", Proceedings of the fifth international ACM conference on Assistive technologies, Session: Multimodal technologies, Year of Publication: 2002, pp. 33-40.
Gross, Mark D., "Grids in Design and CAD", Proceedings of Association for Computer Aided Design in Architecture, Los Angeles, CA, Dated: 1991, 11 Pages.
"Final Cut Drawing Tool Plugins" http://www.lyric.com/fcp-plugins/drawing/grids/grids.htm, May 9, 2008.
"Visio 2000 Technical Edition", http://licenser.adm.gu.se/cth/pgm/Visio2000Tech.htm, May 9, 2008.
International Preliminary Report on Patentability cited in PCT Application No. PCT/US2009/050889 dated Jan. 25, 2011, 6 pgs.
First Chinese Office Action cited in Chinese Application No. 200980129989.3 dated Sep. 12, 2012, 10 pgs.
Reply to first Chinese Office Action cited in Chinese Application No. 200980129989.3 dated Nov. 30, 2012, 11 pgs.
Non-Final Office Action cited in U.S. Appl. No. 12/179,574 dated Sep. 1, 2011, 24 pgs.
Reply to Non-Final Office Action cited in U.S. Appl. No. 12/179,574 dated Nov. 30, 2011, 12 pgs.
Final Office Action cited in U.S. Appl. No. 12/179,574 dated Apr. 18, 2012, 15 pgs.
Reply to Final Office Action cited in U.S. Appl. No. 12/179,574 dated Jul. 18, 2012, 16 pgs.
Non-Final Office Action cited in U.S. Appl. No. 12/179,574 dated Aug. 1, 2012, 27 pgs.
Reply to Non-Final Office Action cited in U.S. Appl. No. 12/179,574 dated Nov. 1, 2012, 15 pgs.
RGraphGallery, addicterdtor.free.fr, pp. 1-3 http://web.archive.org/web/20060419081535/http://addictedfor.free.fr/graphiques/RGraphGallery.php?graph=139, Aug. 18, 2011.
Multi-Search of Video Segments Indexed by Time-Aligned, "Annotation of Video Content", Anni Coden, pp. 1-12, http://researcher.ibm.com/researcher/files/us-smiyaza/haas-fista.pdf, Jun. 27, 2013.

* cited by examiner

PRESENTING DYNAMIC GRIDS

BACKGROUND

Grids are commonly used in drawing programs to aid in creating precise figures. Grids provide a coordinate system on which a user may spatially orient objects within the drawing program. Grids are useful when determining the size and position of objects. Traditional grids have fixed grid size and orientation. The gridline spacing, overall grid size, and grid orientation are determined when the grid is created. Once the grid is created the gridline spacing, orientation and/or position of the grid does not change. Many times users may have to reset grid properties before drawing new objects within the drawings program.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

This disclosure relates to presenting a grid on a display. The display may be a drawing program operating within a computer environment. When presenting the grid, a previously drawn object (e.g. the last line drawn by a user) is identified. A determination may be made as to the properties of the previously drawn object (e.g. angle and dimensional unit (length) of the previously drawn object). Once the previously drawn object's properties are determined, the grid can dynamically adjust the properties of the grid, such as, position of the origin point, angle of the grid, gridline spacing, coordinate mode, etc. The resulting grid is relative in measurements and orientation to the previously drawn object. This makes sketching graphical elements (e.g. lines, a set of lines, a polygonal shape, an image, etc.) more efficient (faster), for example when absolute dimensions do not matter. The dynamic grid is context sensitive (based upon a previously drawn object) and adaptive (automatically or manually change) to what the user is drawing.

The grid may adjust grid properties automatically in response to an object being drawn on the grid. When a user draws a new object, the properties of the grid may adjust to provide a more desirable layout based upon the previously drawn object. An example is where a user has a grid with 300 pixel gridline spacing. If the user begins to draw an object (e.g. line segments of 25 pixels), the grid may automatically change the gridline spacing to a fraction or multiple of 25 pixels (instead of 300 pixels) to provide the user with a more useful measurement reference.

The grid may also adjust grid properties in response to user input. This allows a user to specify at any time when the coordinate mode is to change; when the grid is to rotate to match an angle of a previously drawn object; when to recenter the grid to a position of a previously drawn object; and/or what multiplier (e.g. 3×, 2×, 1×, 0.5×, 0.25×, etc.) is to be applied to determine the gridline spacing of the grid.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

This disclosure relates to presenting a grid on a display. Grids are commonly used in computer drawing programs to help create precise figures. Traditional grids use Cartesian coordinate mode (X,Y grid) with a fixed grid size and orientation. Some grids may also use a radial mode to help facilitate drawing angles. To aid in drawing, many grids will snap a user's object (e.g. line, shape, and any other set of coordinate points) to a point on the grid. The grid's properties were fixed at the time the grid was created. For example, the origin of the grid, the mode (Cartesian, radial) of the grid, gridline spacing, and the orientation (angle) of the grid were all fixed and may not change after the grid was created.

An issue arises when an object does not correspond to the fixed spacing of the grid. A user will spend time thinking about an actual measurement of the object that is drawn (e.g. the gridline spacing is 300 pixels, but the next line to be drawn of the object is only 5 pixels). Drawing objects that do not fit the original fixed gridline spacing man be accomplished much easier when the grid can dynamically adjust to what the user is drawing.

A dynamic grid can adjust gridline spacing based upon a previously drawn object. An example of a previously drawn object is a line segment that a user just drew. The line segment may be a part of a larger object that the user is drawing. Adjusting gridline spacing allows the grid to adapt to what the user is currently drawing, instead of having fixed gridline spacing set when the grid was first created. Once a previously drawn object is identified, a dimensional unit of the previously drawn object is determined. The dimensional unit may be a size vector of the last line segment drawn. The dynamic grid adjusts the gridline spacing as a function of the dimensional unit. This may be accomplished by making the gridline spacing the same as the dimensional unit, making the gridline spacing a fraction of the dimensional unit, and/or adjusting the gridline spacing to a multiplier (e.g. 3×, 2×, 1×, 0.5×, 0.25×, etc.) of the dimensional unit.

Adjusting gridline spacing provides a user the ability to quickly change a grid's gridline spacing to an appropriate size, thereby, facilitating quick and efficient drawing. For example, a user may design a layout for a website by starting with a grid having gridline spacing at 100 pixels. The user may begin drawing larger objects within the website (e.g. tables, buttons, lists, etc.). The user may draw an object corresponding to the 100 pixel gridline spacing (making the grid convenient for facilitation objects of this size). The user may then transition into drawing smaller objects within the website (e.g. thumbnails, status bars, etc.). The user may draw an object have a dimensional unit (line segment length) of 20 pixels. The dynamic grid may detect the dimensional unit of 20 pixels and adjust the gridline spacing based upon the dimensional unit of the previously drawn object. Now the user is provided with a grid (having smaller gridline spacing) that is more appropriate to what the user is currently drawing (smaller object).

Gridline spacing may be detected and adjusted automatically by the grid. The gridline spacing may automatically adjust based upon a default multiplier of the dimensional unit. A default multiplier may be a value chosen within a settings option of the grid, a value calculated by the grid, and/or any other appropriate value. The user also has the option of specifying what the multiplier value may be. One implementation could be to map multipliers (e.g. 3×, 2×, 1×, 0.5×, etc.) to hotkeys on the keyboard. The user can then use a hotkey to quickly switch between multipliers that may be applied to the dimensional unit of a previously drawn object. For example, a user can draw an object, then quickly adjust the gridline spacing to half (0.5×) of the length (dimensional unit) of what was just drawn without having to think about absolute sizing. Gridline spacing adjustment may be done with a grid in Cartesian mode, radial mode, or another coordinate mode.

A dynamic grid can also orient the grid based upon an angle of a previously drawn object. In one example, a previously drawn object (e.g. line segment) is identified, the angle at which the previously drawn object was drawn is determined, and the grid is then oriented based upon the angle. One method of orienting the grid is by rotating the grid a number of degrees equal to the angle. The grid may be reoriented automatically when an object is drawn. The orientation may also be done in response to user input indicating how the grid is to be oriented. Orienting the grid allows a user to quickly draw objects at angles without extra calculations.

In one example, a user draws a line perpendicular to the X axis of a grid. A second line is drawn at a 35 degree angle from the X axis of the grid. The grid may automatically orient (or the user can manually adjust) the grid based upon the 35 degree angle. The orientation may be accomplished by rotating the grid (X,Y axis) 35 degrees. The rotation may be done by rotating the grid at an angle, using the origin as a pivot point. Now the X axis is perpendicular to the second line, allowing for further objects to be drawn in relation to the new grid orientation. Angle orientation may be done with a grid in Cartesian mode, radial mode, or another coordinate mode.

A dynamic grid may be recentered upon a position of a previously drawn object. The position may be a coordinate of the last vertex drawn, the center position of the last object created, and/or any other appropriate position. The origin of the grid may be recentered to match the coordinates of the previously drawn object. The recentering may be done automatically after objects are drawn. The recentering may also be done manually in response to a user input indicating that the grid is to be recentered. This provides a user the ability to start drawing objects from a center (e.g. 0,0 or origin) coordinate of the grid. Recentering may be done with a grid in Cartesian mode, radial mode, or another coordinate mode.

A dynamic grid may be switched dynamically (while drawing) between coordinate modes based upon some criteria. The criteria may be a user input or an automatic response to an event (e.g. the completion of drawing an object). The mode switching may be done in response to user input indicating the mode is to be switched. The mode may also be switched automatically when a previously drawn object fits more appropriately in a different coordinate mode. Dynamic mode switching provides an adaptive environment that facilitates X,Y drawing and/or angular drawing, for example.

Figure 1:
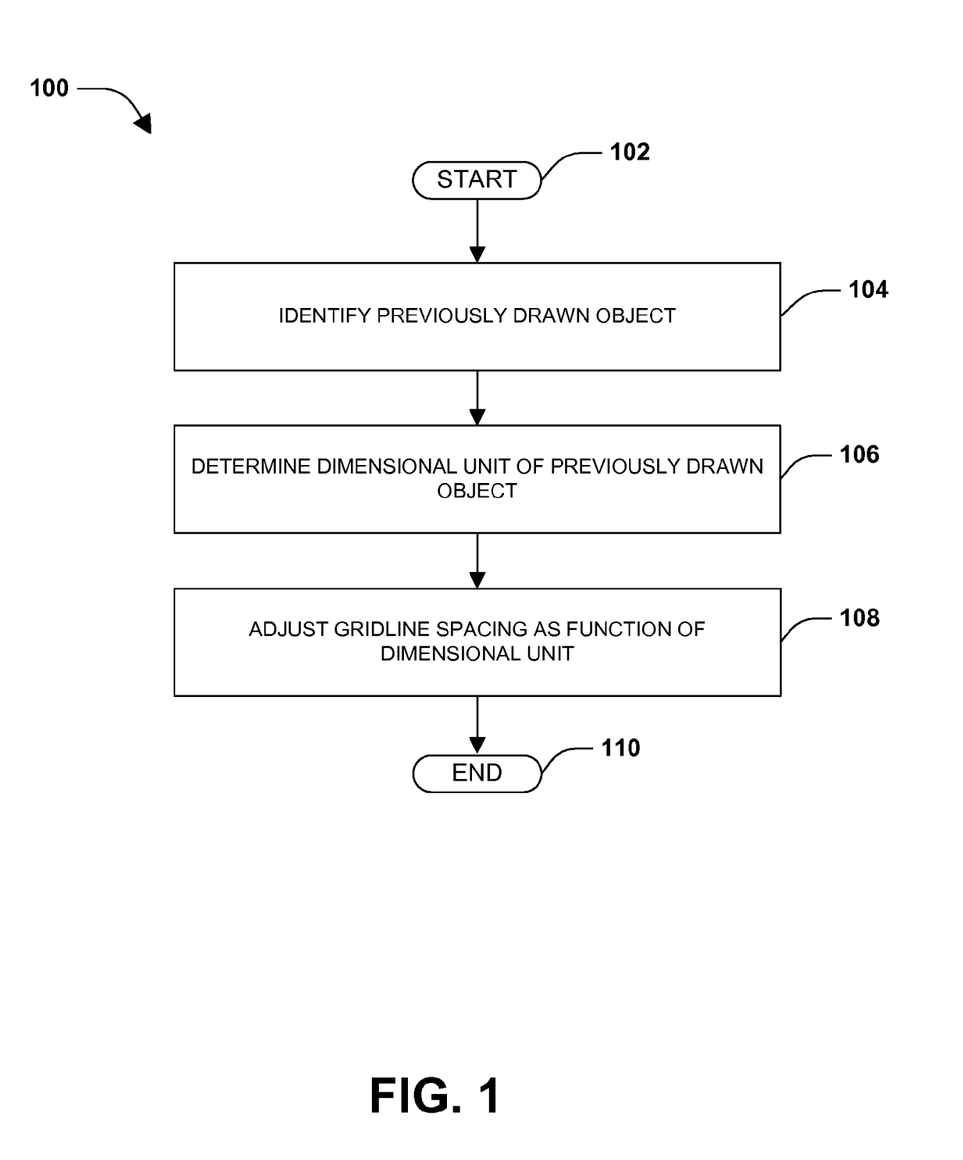
FIG. 1 is an illustration of an exemplary method for presenting a grid on a display.

One embodiment of presenting a grid on a display is illustrated by an exemplary method 100 in FIG. 1. At 102, the method begins. At 104, a previously drawn object is identified. The previously drawn object may be a line segment, shape, or any other object with at least two coordinate points. The previously drawn object may be the last drawn object or any other previously drawn object.

Once the previously drawn object is identified, a determination is made as to a dimensional unit of the previously drawn object, at 106. The dimensional unit may be the difference between two coordinate points of the object, the size of a line segment, the distance between the center and a vertex, the length of the previously object, and/or any other appropriate dimensional unit of the previously drawn object.

At 108, the gridline spacing is adjusted as a function of the dimensional unit. Gridline spacing may be the distance between the lines of a grid. The gridline spacing may be adjust based upon a user defined or default multiplier of the dimensional unit. For example, a grid may begin with a gridline spacing of 500 pixels. A user may draw a line that is 300 pixels in length (the dimensional unit is therefore 300 pixels). The user may specify that a multiplier is to be 0.5. Once the previously drawn object (line) and the dimensional unit (300 pixels) are determined, a new gridline spacing is computed. The new gridline spacing is equal to the dimensional unit×the user specified multiplier (300 pixels×0.5=150 pixels). Now, the new grid has gridline spacing at 150 pixels, providing the user with gridlines that are half the length of the line the user previously drew.

A default multiplier may be defined automatically, or a user may specify a multiplier at any time. A user specified multiplier may be implemented through the use of a user input (e.g. hotkeys of a keyboard). The method 100 of adjusting gridline spacing may be done automatically at any time (e.g. after every time an object is drawn) or when a user input indicates that gridline spacing is to be adjusted. At 110, the method ends.

Figure 2:
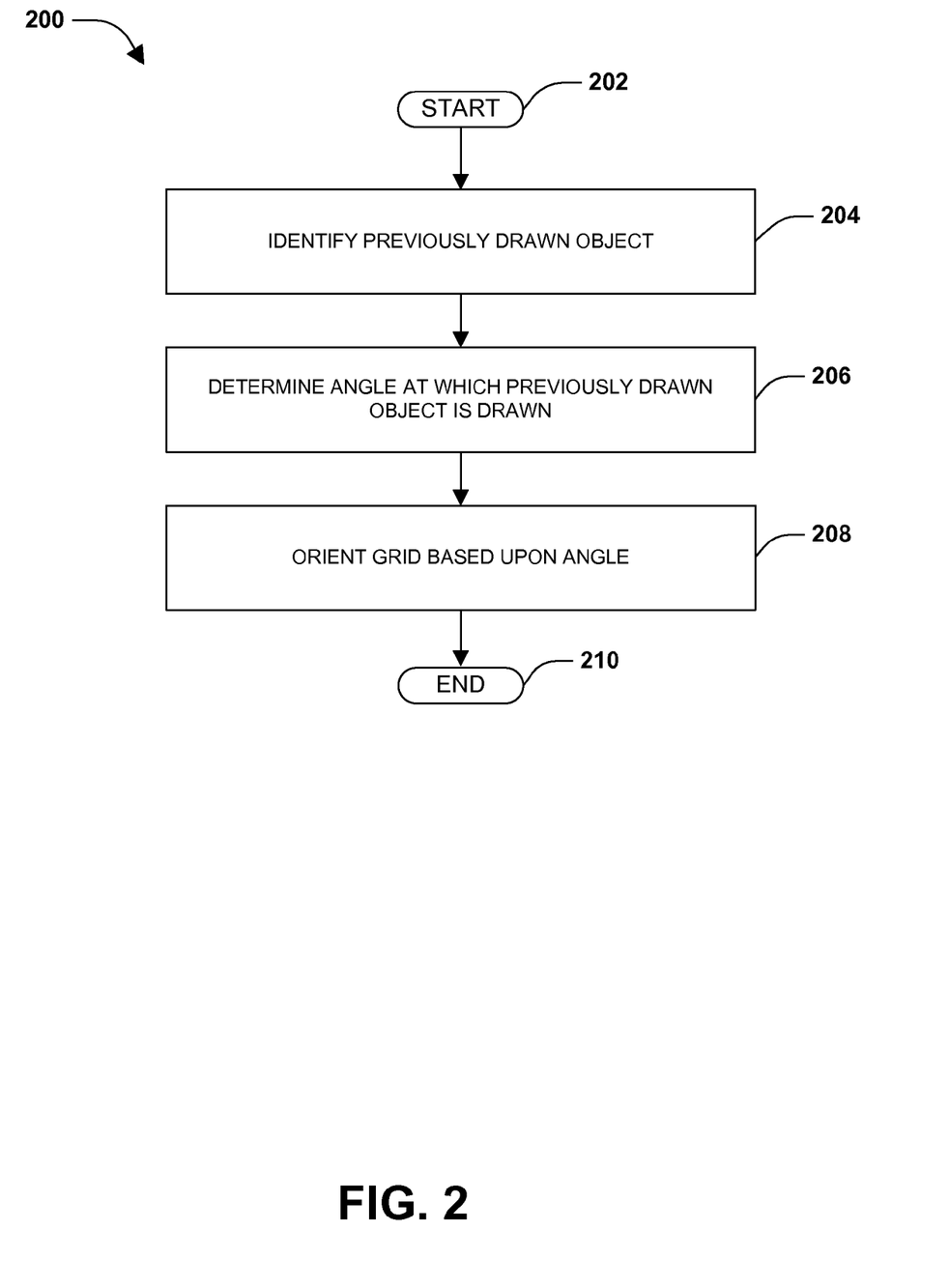
FIG. 2 is an illustration of an exemplary method for presenting a grid on a display.

One embodiment of presenting a grid on a display is illustrated by an exemplary method 200 in FIG. 2. At 202 the method begins. At 204, a previously drawn object is identified. Once the previously drawn object is identified, a determination is made as to an angle of the previously drawn object, at 206. The angle may represent a number of degrees from the X axis that an object (e.g. last vertex, line segment, etc.) is drawn at. At 208, the grid is oriented based upon the angle. The grid may be oriented by rotating the grid a number of degrees corresponding to the angle. The method 200 may be done automatically (e.g. after every time an object is drawn) or when a user input indicates that the grid is to be oriented. At 210, the method ends.

Figure 3:
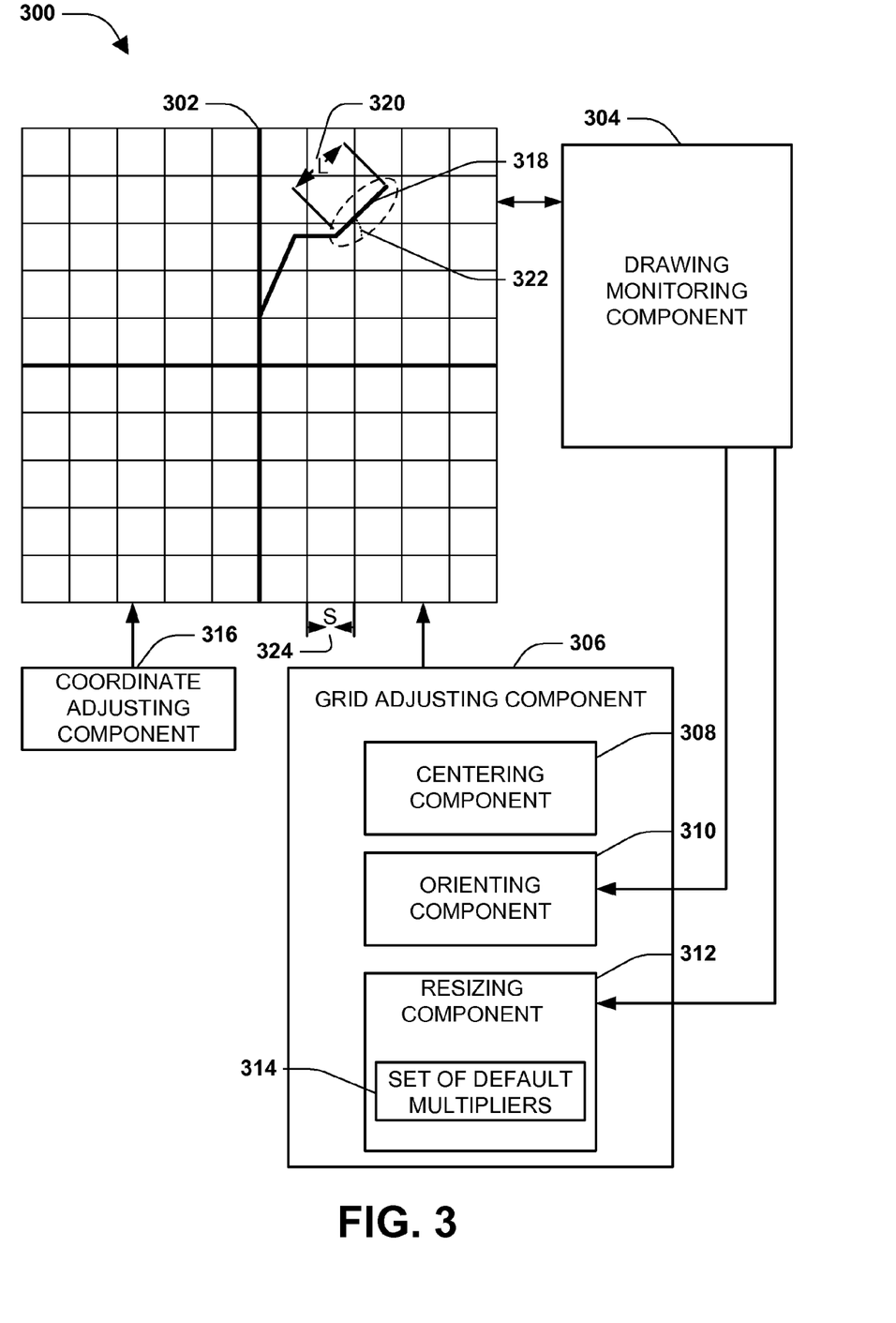
FIG. 3 is an illustration of a system configured to present a grid on a display.

FIG. 3 illustrates an example of a system 300 configured to display a grid 302 on a display. The system 300 comprises a drawing monitoring component 304, a grid adjusting component 306, and a coordinate adjusting component 316. The grid adjusting component 306 comprises a centering component 308, an orienting component 310, and a resizing component 312. The system 300 may also comprise a set of default multipliers 314.

The drawing monitoring component 304 may be configured to identify a previously drawn object 318 within the grid 302. The previously drawn object 318 is a line segment drawn at an angle 322. The previously drawn object 318 has a length, L 320, (distance between the start coordinate and end coordinate). The drawing monitoring component 304 may be configured to determine a dimensional unit at which the previously drawn object 318 was drawn. In this example, the dimensional unit may be L 320, the length of the previously drawn object 318. The drawing monitoring component 304 may also be configured to determine the angle 322 at which the previously drawn object 318 is drawn at.

The drawing monitoring component 304 may be configured to send the dimensional unit (L 320) and/or the angle 322 that was determined from the previously drawn object 318 to components comprised within the grid adjusting component 306. The drawing monitoring component 304 may send the dimensional unit (L 320) to the resizing component 310 and/or send the angle 322 to the orienting component 308.

The resizing component 312 may be configured to adjust gridline spacing (S 324) of the grid 302. The resizing component 312 may adjust gridline spacing (S 324) as a function of the dimensional unit (L 320). The resizing component 312 may select (automatically or in response to user input) a multiplier from a set of default multipliers 314 or from a user specified multiplier. The gridline spacing (S 324) may be adjusted to correspond to the dimensional unit (L 320)× the multiplier. The resizing component 312 may be configured to adjust gridline spacing (S 324) of the grid 302 automatically or in response to user input.

The orienting component 310 may be configured to orient the grid 302 based upon the angle 322. The orienting component 310 may orient the grid 302 by rotating the grid 302 a number of degrees corresponding to the angle 322. The orienting component 310 may be configured to orient the grid 302 automatically or in response to user input.

The centering component 308 may be configured to adjust the position of the grid 302 based upon a position of the previously drawn object 318. The centering component 308 may adjust the position of the grid 302 by recentering the origin (0,0 coordinate) of the grid 302 to a last drawn vertex of the previously drawn object 318. The centering component 308 may be configured to recenter the grid 302 automatically or in response to user input. The coordinate adjusting component 316 may be configured to adjust the mode (Cartesian, radial, etc.) of the grid. The coordinate adjusting component 316 may be configured to adjust the grid mode automatically or in response to user input.

Figure 4:
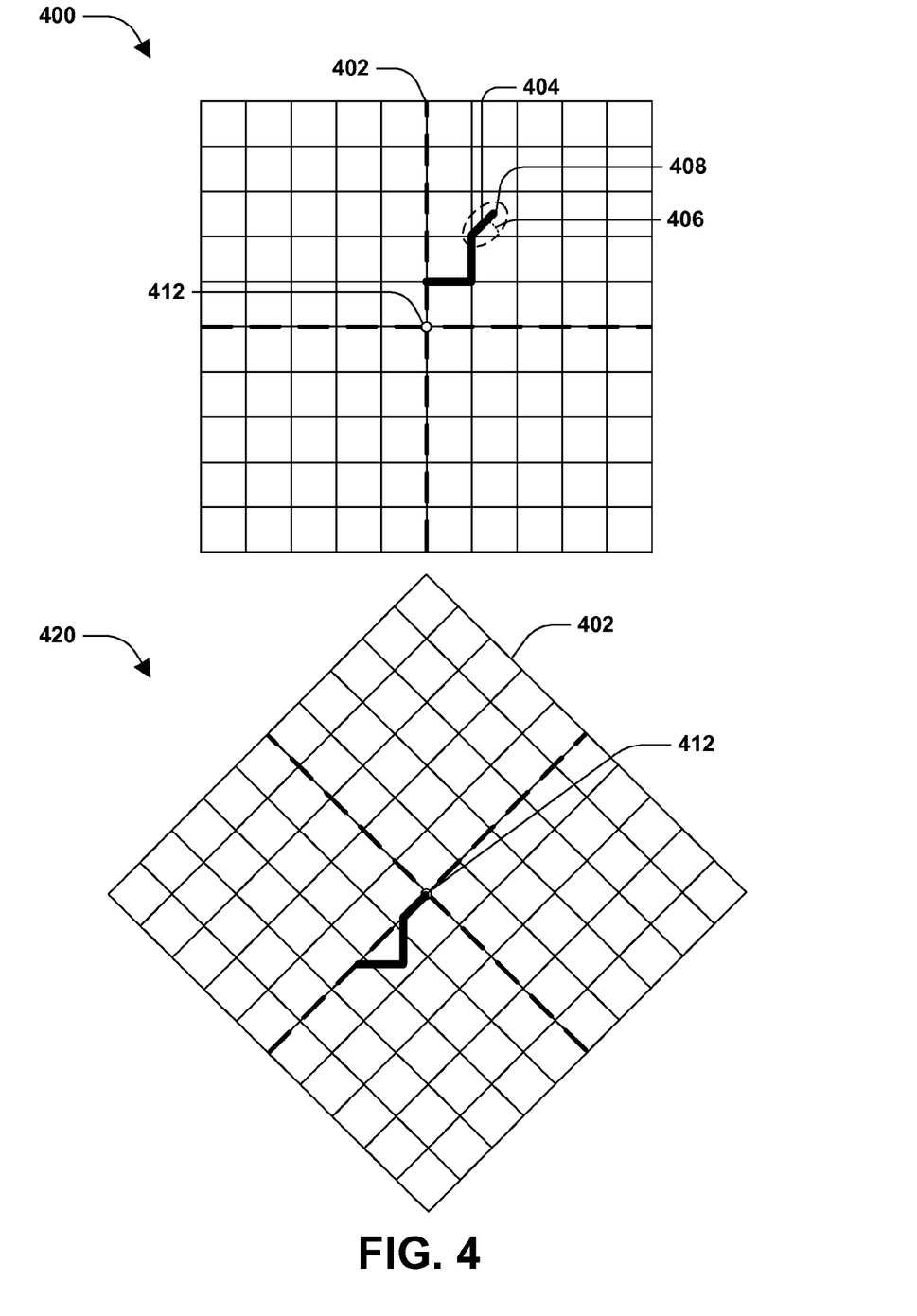
FIG. 4 is an illustration of an example of presenting a grid on a display before and after orienting and recentering the grid.

FIG. 4 illustrates an example 400 of presenting a grid 402 on a display before orienting and recentering the grid 402. FIG. 4 further illustrates an example 420 of presenting the grid 402 after orienting and recentering the grid 402.

Example 400 illustrates the grid 402 in Cartesian mode having an origin 412 (0,0). A user has drawn different objects (set of lines). A previously drawn object 404 may be the last line (object) drawn by the user. The previously drawn object 404 comprises an angle 406 at which the previously drawn object 404 was drawn at. The previously drawn object 404 may also comprise a last vertex drawn 408. The last vertex drawn 408 may be the last coordinate point drawn (ending point or vertex of a line) within the previously drawn object 404.

Example 420 illustrates the grid 402 once it has been oriented and recentered. The grid 402 has been oriented to correspond to the angle 406 of the previously drawn object 404. The grid 402 is rotated a number of degrees equal to the angle 406. The grid 402 has also been recentered. The position of the origin 412 of the grid 402 is recentered to match the position of the previously drawn object 404. The recentered position of the origin may be the last vertex drawn 408 in the previously drawn object 404.

Figure 5:
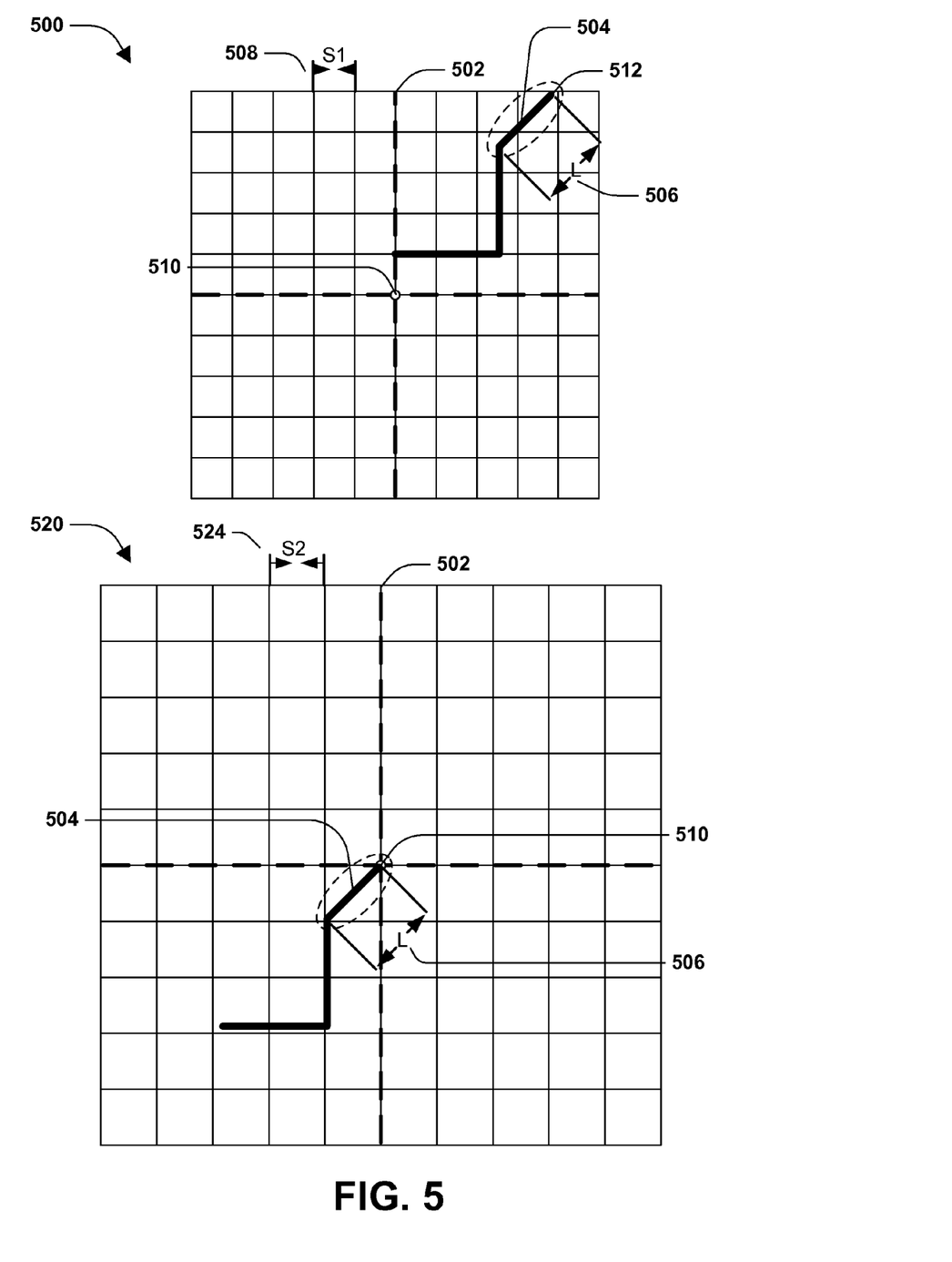
FIG. 5 is an illustration of an example of presenting a grid on a display before and after resizing and recentering the grid.

FIG. 5 illustrates an example 500 of presenting a grid 502 on a display before adjusting gridline spacing and recentering the grid 502. FIG. 5 further illustrates an example 520 of presenting the grid 502 after adjusting gridline spacing and recentering the grid 502.

Example 500 illustrates the grid 502 in Cartesian mode having a gridline spacing (S1 508) and an origin 510 (0,0). A user has drawn different objects (sets of lines). A previously drawn object 504 may be the last line drawn by the user. The previously drawn object 504 comprises a dimensional unit (L 506) which may represent the length of the previously drawn object 504.

Example 520 illustrates the grid 502 that has been recentered and the gridline spacing adjusted. The grid 502 has new gridline spacing (S2 524). The new gridline spacing (S2 524) may be determined based upon the dimensional unit (L 506) of the previously drawn object 504 and a multiplier. A default multiplier or a user specified multiplier may be used to determine the new gridline spacing (S2 524). For example, the grid 502 has gridline spacing (S1 508) of 100 pixels. The dimensional unit (L 506) may be 200 pixels. The user specifies a multiplier of 1. The new gridline spacing (S2 524) is now 200 pixels (dimensional unit×multiplier). The dimensional unit (L 506) (length of the previously drawn object 504) does not change when the gridline spacing is adjusted.

The grid 502 is also recentered. The position of the origin 510 of the grid 502 is recentered to match the position of the previously drawn object 504. The previously drawn object 504 comprises a last vertex drawn 512. The recentered position of the origin may be the last vertex drawn 512 in the previously drawn object 504.

Figure 6:
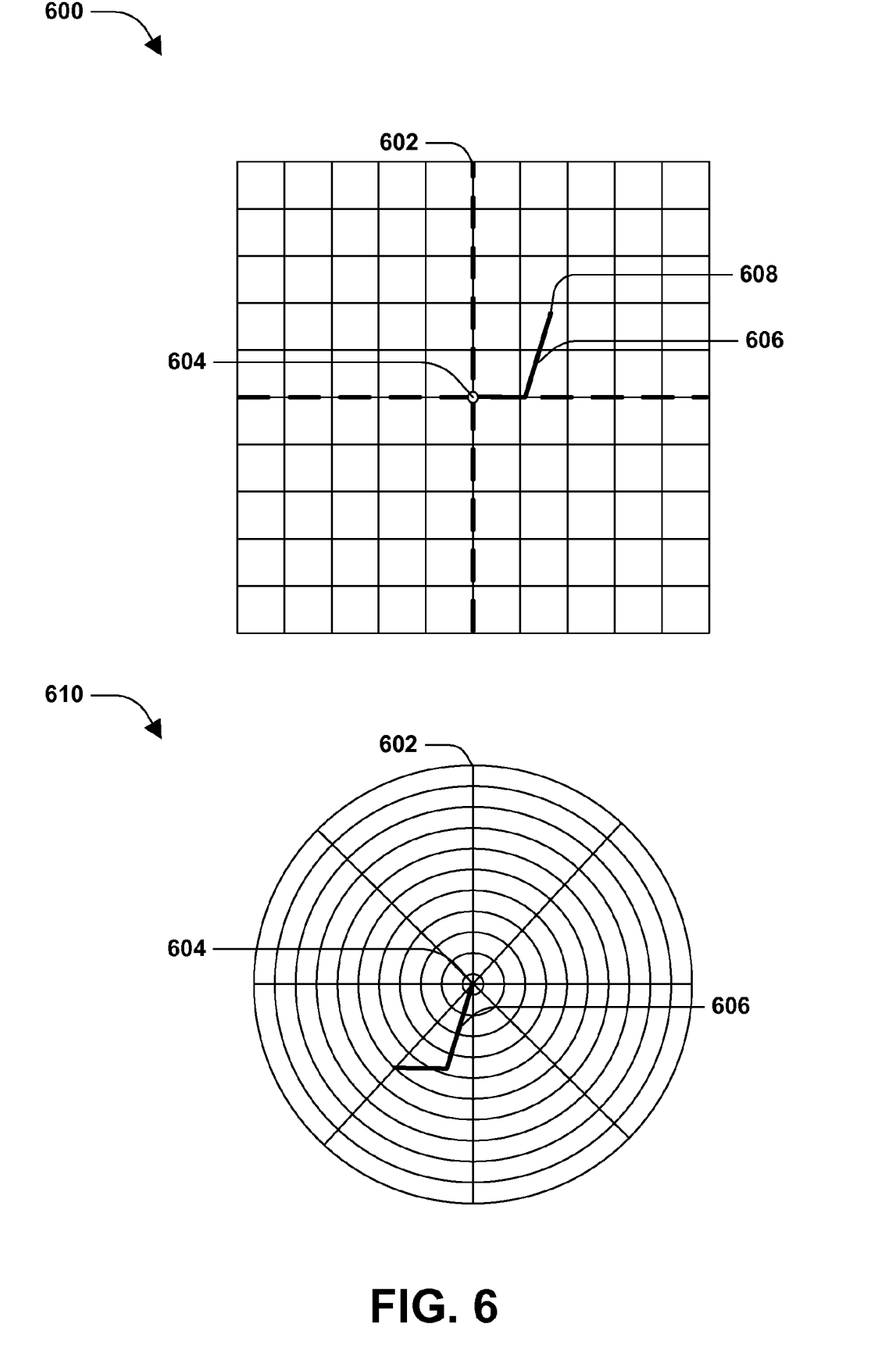
FIG. 6 is an illustration of an example of presenting a grid on a display before and after adjusting a coordinate mode and recentering the grid.

FIG. 6 illustrates an example 600 of presenting a grid 602 on a display before adjusting a coordinate mode and recentering the grid 502. FIG. 6 further illustrates an example 610 of presenting the grid 602 after adjusting a coordinate mode and recentering the grid 602.

Example 600 illustrates the grid 602 in Cartesian coordinate mode (X,Y) having an origin 604 (0,0). The grid 602 comprises a previously drawn object 606 with a last drawn vertex 608. It may be advantageous to a user to switch from Cartesian coordinate mode to radial mode because the previously drawn object 606 was drawn at an angle. The next object the user may draw might also be at an angle. Radial mode is conducive to drawing objects at angles because of the gridline layout.

Example 610 illustrates the grid 602 in radial coordinate mode. The grid 602 may be switched between radial and Cartesian (or Cartesian to radial) modes automatically or in response to user input. The grid 602 is also recentered. The position of the origin 604 of the grid 602 is recentered to correspond to the last vertex drawn 608.

Figure 7:
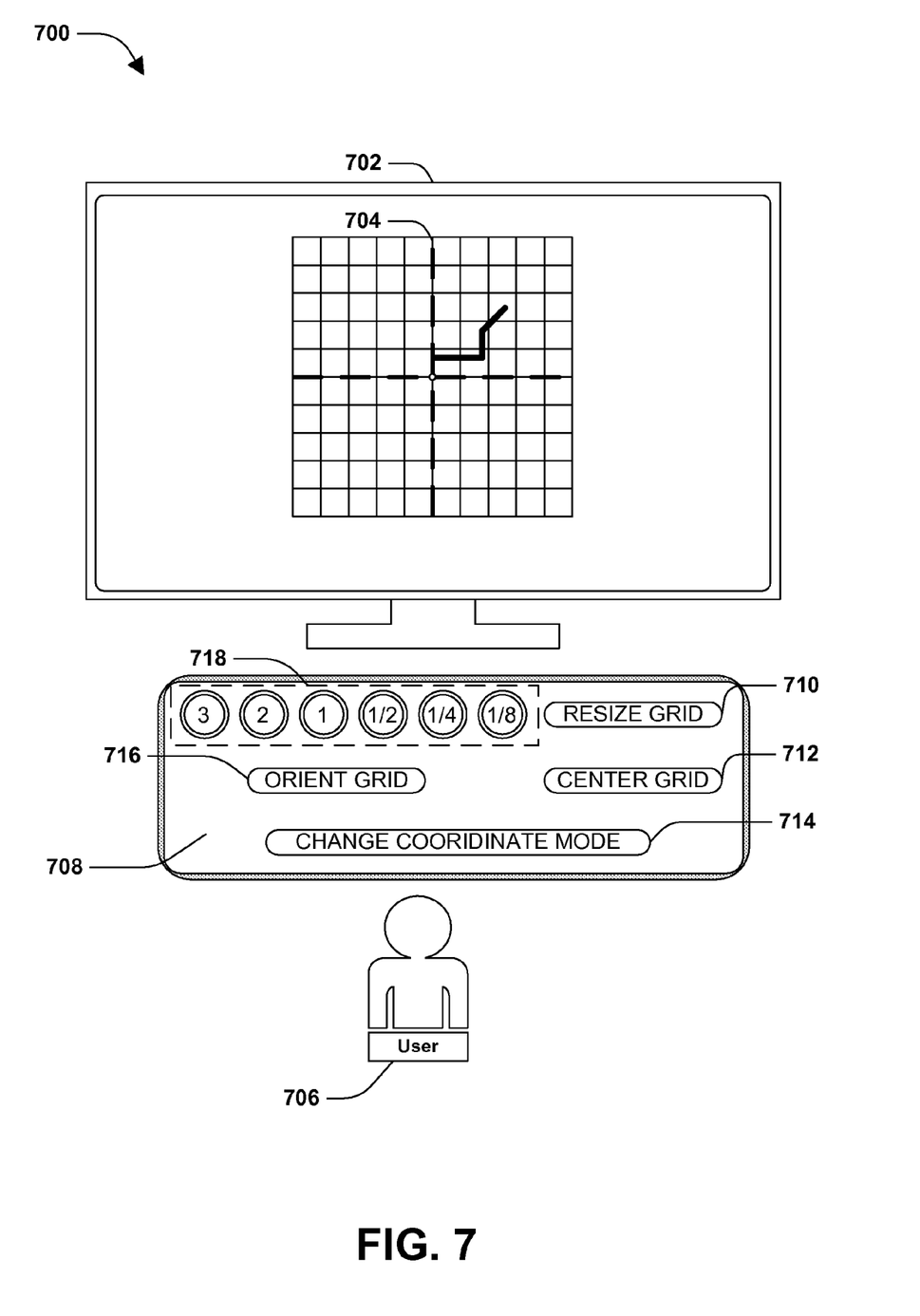
FIG. 7 is an illustration of a system configured to present a grid on a display.

FIG. 7 illustrates an example 700 of a system for presenting a grid 704 on a display 702 to a user 706. The user 706 may view the grid 704 on the display 702 and use a keyboard 708 to interact with the grid 704 (e.g. specify how the grid is presented). The keyboard comprises a resize grid button 710, a center grid button 712, a change coordinate mode button 714, an orient grid button 716, and a set of multiplier buttons 718. The user 706 may use the resize grid button 710 to adjust gridline spacing. The center grid button 712 allows the user 706 to recenter the position (e.g. origin) of the grid 704 to a position of a previously drawn object. The change coordinate mode button 714 allows the user to switch the coordinate mode of the grid 704 between coordinate modes.

The orient grid button 716 allows the user 706 to orient the grid 704 corresponding to an angle of a previously drawn object. The grid 704 may be rotated a number of degrees corresponding to the angle. The set of multiplier buttons 718 allows the user to specify a multiplier. The multiplier is then used when resizing (changing gridline spacing) the grid 704. The keyboard 708 and functionality comprised within the buttons of the keyboard 708 may be invoked by the user 706 at any time.

Figure 8:
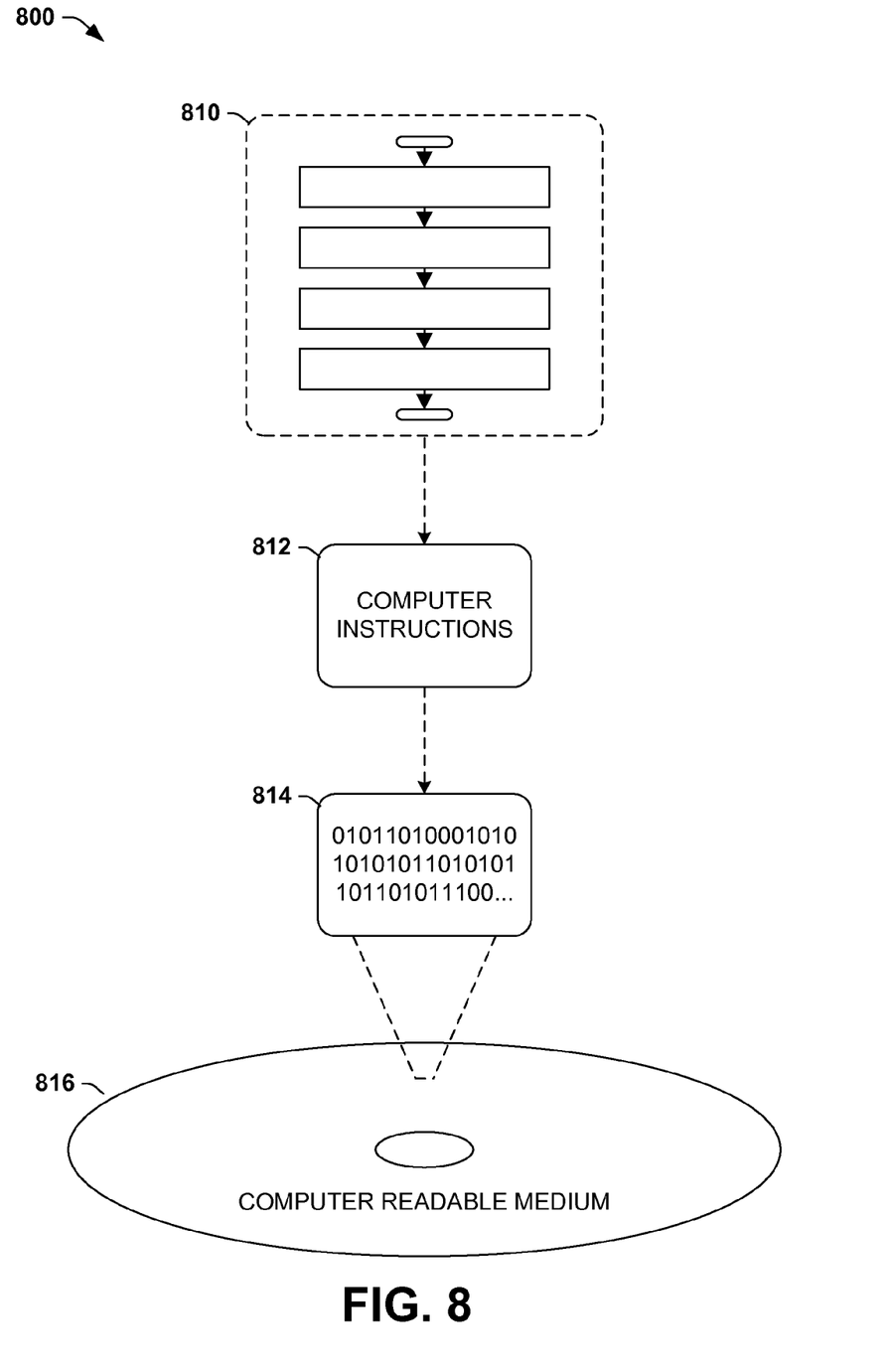
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 810. This computer-readable data 810 in turn comprises a set of computer instructions 812 configured to operate according to one or more of the principles set forth herein. In one such embodiment 600, the processor-executable instructions 814 may be configured to perform a method, such as the exemplary method 100 of FIG. 1, for example. In another such embodiment, the processor-executable instructions 814 may be configured to implement a system, such as the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
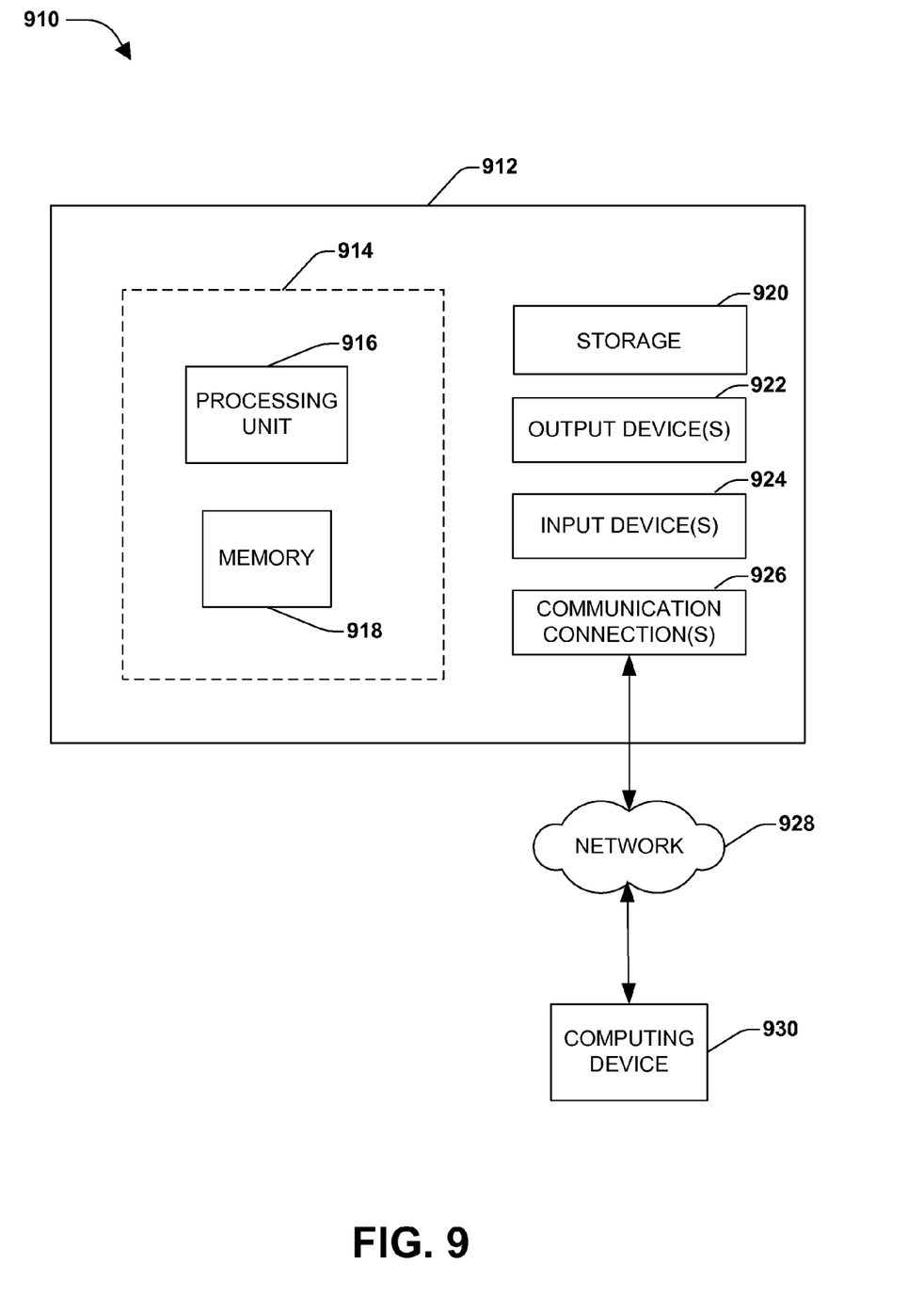
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for presenting a grid on a display, comprising:
   determining that a user has completed drawing a line of a graphical element being drawn within a grid comprising four or more cells each having a first gridline spacing, the first gridline spacing specifying a first length dimension between each of a first set of gridlines and a first width dimension between each of a second set of gridlines, the first set and the second set defining the four or more cells, the four or more cells of the grid comprising a first cell, a second cell, a third cell and a fourth cell, the first cell adjacent to the second cell and the fourth cell, the second cell adjacent to the third cell, the third cell adjacent to the fourth cell;
   responsive to the determining that the user has completed drawing the line, determining a dimensional unit of the line, a first axis component of the dimensional unit exceeding the first gridline spacing; and
   responsive to the determining the dimensional unit, where the dimensional unit corresponds to a length of the line, automatically adjusting gridline spacing of the four or more cells of the grid from the first gridline spacing to a second gridline spacing as a function of the dimensional unit, the first axis component of the dimensional unit not exceeding the second gridline spacing, the first gridline spacing being different than the second gridline spacing, the second gridline spacing specifying a second length dimension between each of the first set of gridlines that is different than the first length dimension and a second width dimension between each of the second set of gridlines that is different than the first width dimension, at least one of the identifying, the determining, or the automatically adjusting being implemented at least in part via a computer-based processing unit.

2. The method of claim 1, the automatically adjusting the gridline spacing comprising:
adjusting the gridline spacing between gridlines uniformly across the grid.

3. The method of claim 1, the grid comprising a plurality of horizontal gridlines corresponding to the first set and a plurality of vertical gridlines corresponding to the second set, the plurality of horizontal gridlines perpendicular to the plurality of vertical gridlines.

4. The method of claim 1, comprising:
recentering the grid based on a position of the line.

5. The method of claim 1, comprising at least one of the following:
adjusting the grid to a Cartesian coordinate mode based on user input; or
adjusting the grid to a radial mode based on user input.

6. A method performed by a computing device for presenting a grid on a display, comprising:
determining that a user has completed drawing a line of a graphical element being drawn within a grid having a first orientation, the line not parallel to one or more gridlines of the grid when the grid has the first orientation;
responsive to the determining that the user has completed drawing the line, determining an angle at which the line is drawn within the grid; and
responsive to the determining the angle of the line within the grid, automatically orienting the grid from the first orientation to a second orientation based upon the angle of the line within the grid without orienting the line, the line parallel to one or more gridlines of the grid when the grid has the second orientation, the first orientation different than the second orientation, at least some of at least one of the determining or the automatically orienting implemented at least in part via a computer-based processing unit.

7. The method of claim 6, the automatically orienting comprising:
rotating the grid a number of degrees to match the angle.

8. The method of claim 6, the grid comprising a plurality of horizontal gridlines and a plurality of vertical gridlines, the plurality of horizontal gridlines perpendicular to the plurality of vertical gridlines before and after the grid is oriented.

9. The method of claim 6, the grid comprising a non-perspective grid.

10. The method of claim 6, comprising:
recentering the grid based on an ending position of the line.

11. The method of claim 6, comprising:
adjusting the grid to a new mode comprising at least one of a Cartesian coordinate mode or a radial mode if a determination is made that the new mode is more appropriate for the line.

12. A system for displaying a grid on a display, comprising:
a drawing monitoring component configured to:
determine that a user has completed drawing a line of a graphical element being drawn within a grid comprising four or more cells, the four or more cells of the grid comprising a first cell, a second cell, a third cell and a fourth cell, the first cell adjacent to the second cell and the fourth cell, the second cell adjacent to the third cell, the third cell adjacent to the fourth cell, and
determine an angle at which the line is drawn within the grid; and
a grid adjusting component comprising:
an orienting component configured to automatically orient the grid from a first orientation to a second orientation based on the angle of the line within the grid without orienting the line, the line not parallel to one or more gridlines of the grid when the grid has the first orientation, the line parallel to one or more gridlines of the grid when the grid has the second orientation.

13. The system of claim 12, the first orientation different than the second orientation.

14. The system of claim 12, the orienting component configured to orient the grid from the second orientation to a third orientation in response to user input indicating that the grid is to be oriented.

15. The system of claim 12, further comprising a resizing component comprising:
a set of default multipliers.

16. The system of claim 15, the resizing component configured to:
select a default multiplier from the set of default multipliers, and
adjust the gridline spacing as a function of the default multiplier.

17. The system of claim 12, wherein:
the drawing monitoring component is further configured to:
determine a dimensional unit of the line; and
the grid adjusting component further comprises:
a resizing component configured to, responsive to determining the dimensional unit, where the dimensional unit corresponds to a length of the line, automatically adjust gridline spacing of the four or more cells of the grid from a first gridline spacing to a second gridline spacing as a function of the dimensional unit, the first gridline spacing of the grid not corresponding to a first axis component of the dimensional unit, the second gridline spacing corresponding to the first axis component of the dimensional unit, or
a centering component configured to automatically adjust a position of the grid based upon the line within the grid, at least some of at least one of the drawing monitoring component or the grid adjusting component implemented at least in part via a computer-based processing unit.

18. The system of claim 17, the resizing component configured to adjust the gridline spacing as a function of a user specified multiplier of the dimensional unit, or to automatically adjust the gridline spacing as a function of a default multiplier of the dimensional unit.

19. The system of claim 17, the centering component configured to adjust the position of the grid based on a position of the line.

20. The system of claim 17, the centering component configured to adjust the position of the grid from a first position to a second position.

* * * * *